US011609791B2

(12) United States Patent
Acharya et al.

(10) Patent No.: US 11,609,791 B2
(45) Date of Patent: Mar. 21, 2023

(54) PRECISE SUSPEND AND RESUME OF WORKLOADS IN A PROCESSING UNIT

(71) Applicant: ADVANCED MICRO DEVICES, INC., Santa Clara, CA (US)

(72) Inventors: Anirudh R. Acharya, San Diego, CA (US); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 41 days.

(21) Appl. No.: 15/828,059

(22) Filed: Nov. 30, 2017

(65) Prior Publication Data

US 2019/0163527 A1    May 30, 2019

(51) Int. Cl.
*G06F 9/50* (2006.01)
*G06T 1/20* (2006.01)
*G06F 9/52* (2006.01)
*G06F 9/48* (2006.01)

(52) U.S. Cl.
CPC ............ *G06F 9/505* (2013.01); *G06F 9/4843* (2013.01); *G06F 9/526* (2013.01); *G06T 1/20* (2013.01)

(58) Field of Classification Search
CPC ............ G06F 9/30043; G06F 9/30076; G06F 9/3009; G06F 9/3851; G06F 9/462; G06F 9/4843; G06F 9/505; G06F 9/526
See application file for complete search history.

(56) References Cited

U.S. PATENT DOCUMENTS

| | | | |
|---|---|---|---|
| 6,947,047 B1* | 9/2005 | Moy | G06F 9/30181 345/501 |
| 2008/0256551 A1 | 10/2008 | Priel et al. | |
| 2011/0115802 A1* | 5/2011 | Mantor | G06T 15/005 345/520 |
| 2011/0242119 A1 | 10/2011 | Bolz et al. | |
| 2012/0096474 A1* | 4/2012 | Jiao | G06F 9/485 718/107 |

(Continued)

FOREIGN PATENT DOCUMENTS

WO    2016099653 A1    6/2016

OTHER PUBLICATIONS

International Search Report and Written Opinion dated Jan. 9, 2019 for Application No. PCT/US2018/051735, 11 pages.

(Continued)

*Primary Examiner* — Van H Nguyen

(57) ABSTRACT

A first workload is executed in a first subset of pipelines of a processing unit. A second workload is executed in a second subset of the pipelines of the processing unit. The second workload is dependent upon the first workload. The first and second workloads are suspended and state information for the first and second workloads is stored in a first memory in response to suspending the first and second workloads. In some cases, a third workload executes in a third subset of the pipelines of the processing unit concurrently with executing the first and second workloads. In some cases, a fourth workload is executed in the first and second pipelines after suspending the first and second workloads. The first and second pipelines are resumed on the basis of the stored state information in response to completion or suspension of the fourth workload.

21 Claims, 6 Drawing Sheets

(56) References Cited

U.S. PATENT DOCUMENTS

| | | | |
|---|---|---|---|
| 2013/0117760 A1* | 5/2013 | Cuadra | G06F 9/3887 |
| | | | 718/108 |
| 2013/0300655 A1* | 11/2013 | Cameron | G06F 9/461 |
| | | | 345/157 |
| 2014/0022263 A1* | 1/2014 | Hartog | G06F 9/48 |
| | | | 345/506 |
| 2014/0198116 A1* | 7/2014 | Veal | G11C 16/349 |
| | | | 345/531 |
| 2015/0002522 A1 | 1/2015 | Nalluri et al. | |
| 2015/0178879 A1 | 6/2015 | Palmer et al. | |
| 2015/0277981 A1* | 10/2015 | Nalluri | G06F 9/5038 |
| | | | 718/103 |
| 2015/0379730 A1 | 12/2015 | Tsakok et al. | |
| 2016/0019063 A1* | 1/2016 | Rappoport | G06F 9/30 |
| | | | 712/212 |
| 2016/0140686 A1* | 5/2016 | Lueh | G06F 9/30076 |
| | | | 345/522 |
| 2017/0091895 A1 | 3/2017 | Acharya et al. | |
| 2017/0116701 A1 | 4/2017 | Acharya et al. | |
| 2017/0249152 A1 | 8/2017 | Cuadra et al. | |
| 2018/0293102 A1* | 10/2018 | Ray | G06T 1/20 |

OTHER PUBLICATIONS

International Preliminary Report on Patentability dated Jun. 11, 2020 for International Application No. PCT/US2018/051735, 10 pages.
Extended European Search Report dated Jul. 7, 2021 for Application No. 18884332.0, 9 Pages.
First Examination Report dated Apr. 5, 2022 for Indian Patent Application No. 202017021972, 6 pages.
Office Action dated Nov. 8, 2022 for Japanese Application No. 2020-528695, 6 pages.

* cited by examiner

PRECISE SUSPEND AND RESUME OF WORKLOADS IN A PROCESSING UNIT

BACKGROUND

Processing units such as graphics processing units (GPUs) typically implement multiple processor cores that are able to pipeline instructions or concurrently execute instructions for one or more workloads. The processor cores in a GPU process three-dimensional (3-D) graphics using a graphics pipeline formed of a sequence of programmable shaders and fixed-function hardware blocks. For example, a 3-D model of an object that is visible in a frame is represented by a set of primitives such as triangles, other polygons, or patches which are processed in the graphics pipeline to produce values of pixels for display to a user. Pipelines in the GPU are also able to process compute workloads that may or may not be associated with a graphics workload. In some cases, there are dependencies between the compute workload and the graphics workload. For example, a compute workload executing in one pipeline of the GPU can provide input (such as a position of a moving object that is to be rendered) to a graphics workload executing in one or more other pipelines of the GPU.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
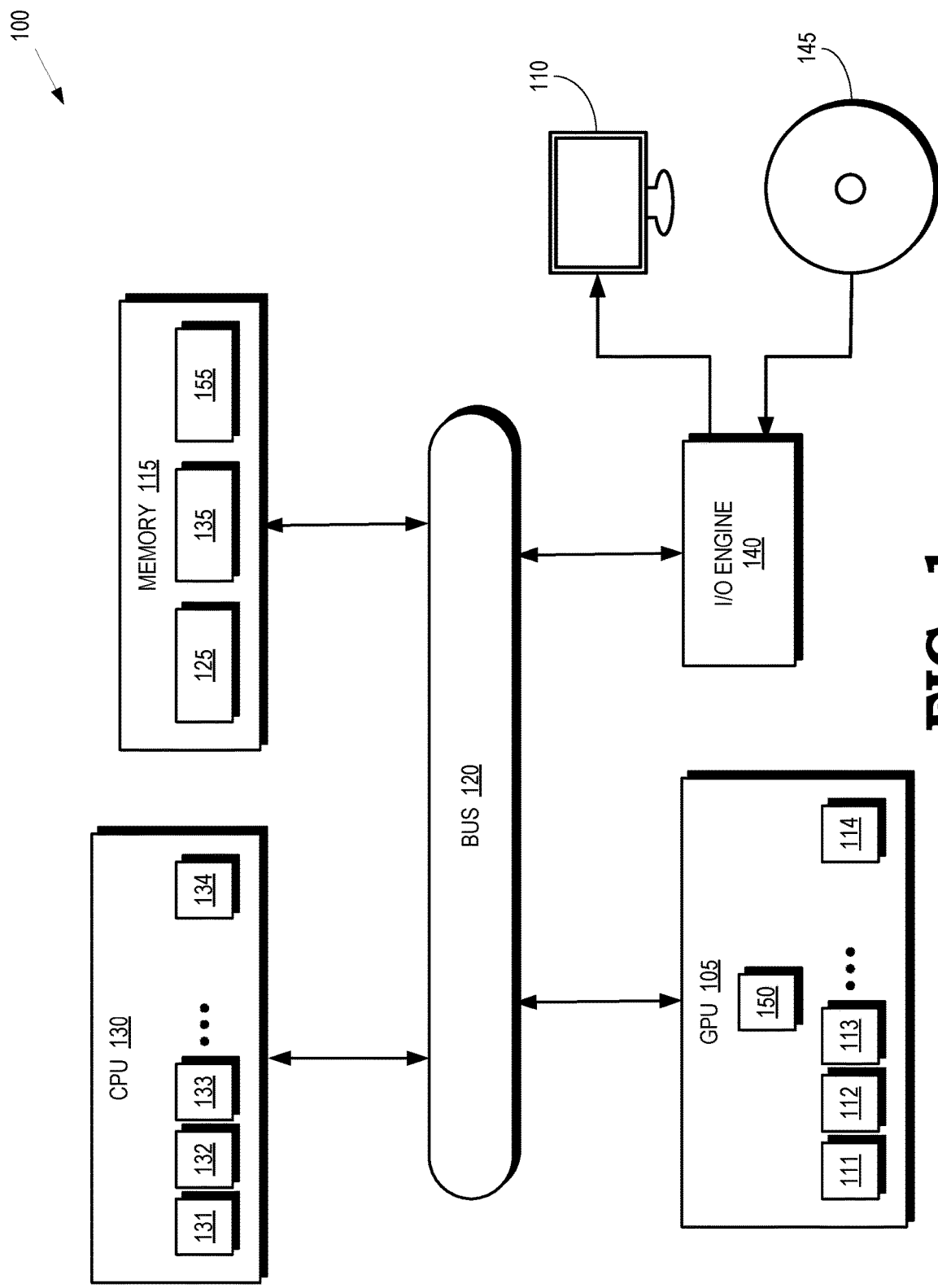
FIG. 1 is a block diagram of a processing system that includes a graphics processing unit (GPU) for generating visual images intended for output to a display according to some embodiments.

Typically, workloads that are executing in pipelines of a processing unit such as a graphics processing unit (GPU) are preempted to allow other higher priority workloads to execute in the pipelines. Working states of the workloads executing in the pipelines of a processing unit are stored in on chip memories such as vector general-purpose registers (VGPRs), local data shares (LDSs), and the like. Preempting a workload that is executing in a pipeline of the processing unit to allow another workload to execute requires saving the currently executing workload data (and corresponding state information) from the pipeline into an external, off-chip memory before beginning execution of the preempting workload thus introducing a delay in processing the new workload. Furthermore, typical preemption schemes do not consider whether dependencies exist between workloads executing on different pipelines that are implemented in the processing unit. Preemption of a pipeline can therefore negatively affect processes executing on other pipelines if a dependency exists between the process executing on the preempted pipeline and the processes executing on the other pipelines. Failing to consider the interdependence of workloads at preemption also affects the state of the pipeline when the process is resumed, in which case the process may not resume in precisely the same state at the execution function unit level.

FIGS. 1-6 illustrate a "gang preemption" technique that supports low latency switching between different workloads at precise locations without requiring pipelines in a processing unit to drain before preemption. In some embodiments, a first subset of pipelines in a processing unit is executing a first workload and a second subset of pipelines in the processing unit is executing a second workload that may or may not be dependent upon the first workload. For example, the second workload is dependent upon the first workload if the first workload is a compute workload and the second workload is a graphics workload that receives input from the compute workload. In some embodiments, a third workload is executing on a third subset of the pipelines concurrently with the first and second workloads, e.g., if an operating system is executing on a third subset of the pipelines. Execution of the first and second workloads is suspended and state information for the first and second subsets of pipelines is stored in a first memory. Once the first and second workloads have been preempted, the first and second subsets of pipelines become available to execute other workloads. In some embodiments, a fourth workload is executed using the first and second subsets of the pipelines, potentially in combination with other workloads. The third workload continues executing concurrently with the fourth workload and, if present, the other workloads.

In response to completion or suspension of the fourth workload and, if present, the other workloads, the state information for the first and second workloads is read from the first memory and used to configure the first and second subsets of the pipelines, respectively. Execution of the first and second workloads is then resumed on the first and second subsets of the pipelines, respectively, in precisely the same state that existed prior to suspension. For example, multiple instances of shaders that are executing on a set of single instruction, multiple data (SIMD) processor cores are preempted and then resumed on the same set of SIMD processor cores that were executing the shaders prior to preemption, and in the same states. Resuming execution of preempted workloads from precisely the same state that existed prior to suspension is particularly important for interdependent workloads that are executing on multiple pipelines to produce a final result (e.g., compute and graphics workloads generated by a game application). In some embodiments, state information stored in the first memory is written to persistent storage in response to the processing unit powering down. The state information is then written from the persistent storage to the first memory in response to the processing unit powering up.

FIG. 1 is a block diagram of a processing system 100 that includes a graphics processing unit (GPU) 105 for generating visual images intended for output to a display 110 according to some embodiments. The GPU 105 is a multi-threaded processor that includes a plurality of compute units 111, 112, 113, 114, which are collectively referred to herein as "the compute units 111-114." The compute units 111-114 are configured to execute instructions concurrently or in parallel. Some embodiments of the compute units 111-114 are configured to implement a relatively small set of operations, such as basic mathematical operations required for video rendering. Although four compute units 111-114 are shown in FIG. 1 in the interest of clarity, some embodiments of the GPU 105 include tens or hundreds or thousands of compute units. Some embodiments of the compute units 111-114 concurrently execute multiple instances (or waves) of a single program on multiple data sets, e.g. as single instruction, multiple data (SIMD) waves. For example, the compute units 111-114 are configured to perform the same sequence of operations on arrays or streams of data.

The processing system 100 includes a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 executes instructions stored in the memory 115 and the GPU 105 stores information in the memory 115 such as the results of the executed instructions. For example, the memory 115 stores a copy 125 of instructions from a program code that is to be executed by the compute units 111-114 in the GPU 105.

The processing system 100 includes a central processing unit (CPU) 130 for executing instructions. Some embodiments of the CPU 130 include multiple processor cores 131, 132, 133, 134 (collectively referred to herein as "the processor cores 131-134") that are optimized for sequential serial processing. The processor cores 131-134 implement relatively large instruction sets (e.g., relative to the small instruction sets implemented by the compute units 111-114) and large feature sets that enable the CPU 130 to perform the full repertoire of calculations that are required by applications executing in the processing system 100. Some embodiments of the CPU 130 are able to implement multiple pipelines using the processor cores 131-134. The CPU 130 is also connected to the bus 120 and therefore communicates with the GPU 105 and the memory 115 via the bus 120. The CPU 130 executes instructions such as program code 135 stored in the memory 115 and the CPU 130 stores information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). In response to the draw call, the GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 is able to communicate with the GPU 105, the memory 115, or the CPU 130. In the illustrated embodiment, the I/O engine 140 is configured to read information stored on an external storage medium 145, such as a compact disk (CD), a digital versatile disc (DVD), a networked server, and the like. The external storage medium 145 stores information representative of program code used to implement an application such as a video game. The program code on the external storage medium 145 is written to the memory 115 to form the copy 125 of instructions that are to be executed by the GPU 105 or the program code 135 that is to be executed by the CPU 130.

The compute units 111-114 in the multithreaded GPU 105 share resources that are used to support execution of waves in the GPU 105. Some embodiments of the GPU 105 implement a set of vector general-purpose registers (VGPR, not shown in FIG. 1 in the interest of clarity) that store state information for the waves that are executing on the compute units 111-114. The VGPRs are shared between the waves that are concurrently executing on the compute units 111-114. For example, each wave is allocated a subset of the VGPRs to store state information for the wave. The waves also share other resources of the GPU 105 including a local data share that is partitioned among the concurrently executing waves, memory bandwidth that is shared by the waves for accessing local caches, and the like. The processor cores 131-134 in the multithreaded CPU 130 also share resources.

The GPU 105 is configured to implement multiple pipelines for executing multiple workloads concurrently or in parallel. Some embodiments of the compute units 111-114 are used to implement graphics pipelines that execute graphics workloads to render images of objects for presentation on the display 110. Some embodiments of the compute units 111-114 are also used to implement compute pipelines to execute compute workloads. For example, a first subset of the compute units 111-114 implements one or more graphics pipelines and a second subset of the compute units 111-114 implements one or more compute pipelines. Some embodiments of the processor cores 131-134 of the CPU 130 are also configured to implement multiple pipelines and therefore operates in a manner that is similar to the GPU 105. Thus, in the interest of clarity, the following discussion is presented in the context of the GPU 105 with the understanding that the same techniques are applicable to the CPU 130.

The workloads executing on different pipelines of the GPU 105 are dependent on each other in some cases. For example, a compute workload is used to perform computations for a model of a scene that is to be rendered by a graphics workload. The compute workload performs computations such as computing the position of a moving object within the scene. The graphics workload renders an image that represents a portion of the scene including the moving object. The graphics workload is dependent upon the compute workload because the compute workload provides input to the graphics workload that is needed to render the scene, e.g., a location and orientation of the moving object. Data generated by the compute workload in a compute pipeline is therefore transferred from the compute pipeline to one or more graphics pipelines and made available to the graphics workload that is executing in the graphics pipelines.

Software or a driver 150 implemented to drive the GPU 105 is able to identify dependencies between workloads either explicitly or implicitly, e.g., using information provided by the application that is generating the workloads. When a dependency exists between the workloads executing on different pipelines implemented using the compute units 111-114 that are scheduled by software or hardware in the GPU 105, the dependent workloads are selectively suspended without suspending other workloads executing on other pipelines implemented using the compute units 111-114. In some embodiments, a first workload is executing in a first subset of pipelines of the GPU 105. A second workload is executing in a second subset of the pipelines of the GPU 105 and the second workload is dependent upon the first workload. The GPU 105 suspends the first and second workloads. The GPU 105 also stores state information 155 for the first and second workloads in a first memory in response to suspending the first and second workloads. For example, the GPU 105 stores the state information 155 in the memory 115. Examples of state information for a workload include draw state information, dispatch state information, a SIMD identifier, a shader engine identifier, memory management information, resource information, and the like.

To resume the suspended workloads, the state information 155 is used to configure the first and second pipelines in the state that existed prior to suspension of the first and second workloads. Execution of the first and second workloads is then resumed. Dependent workloads are resumed on the same compute units 111-114 that they were executing on when the dependent workloads were suspended. Consequently, the dependent workloads resume execution in the exact conditions that existed prior to suspension.

Figure 2:
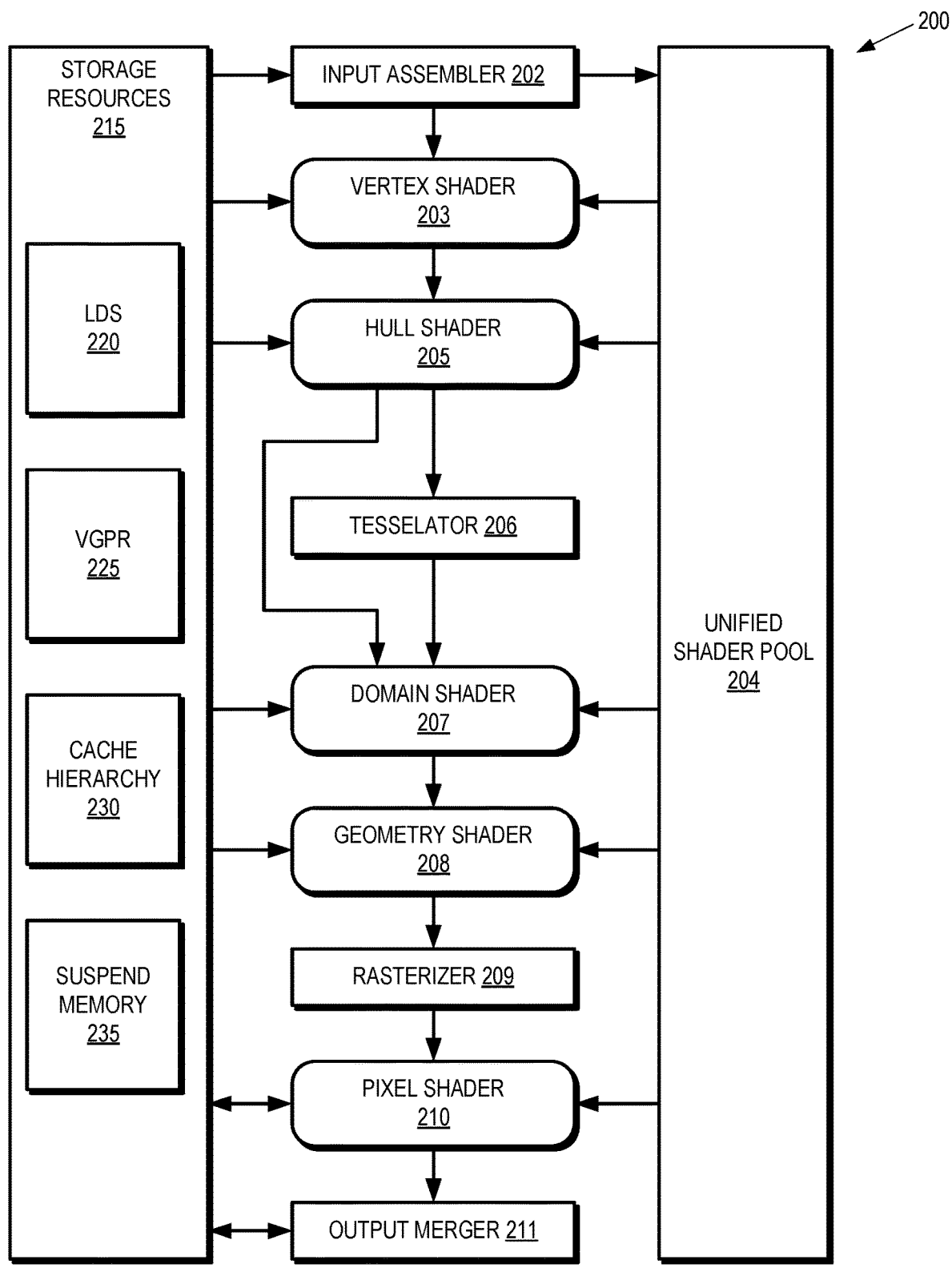
FIG. 2 depicts a graphics pipeline that is capable of processing high-order geometry primitives to generate rasterized images of three-dimensional (3-D) scenes according to some embodiments.

FIG. 2 depicts a graphics pipeline 200 that is capable of processing high-order geometry primitives to generate rasterized images of three-dimensional (3-D) scenes according to some embodiments. The graphics pipeline 200 is implemented in some embodiments of the GPU 105 shown in FIG. 1. For example, in some embodiments the graphics pipeline 200 is implemented using the compute units 111-114 in the GPU 105 shown in FIG. 1.

The graphics pipeline 200 includes an input assembler 202 that is configured to access information from the storage resources 201 that is used to define objects that represent portions of a model of a scene. A vertex shader 203, which can be implemented in software, logically receives a single vertex of a primitive as input and outputs a single vertex. Some embodiments of shaders such as the vertex shader 203 implement single-instruction-multiple-data (SIMD) processing so that multiple vertices are processed concurrently, e.g., by the compute units 111-114 shown in FIG. 1. The graphics pipeline 200 shown in FIG. 2 implements a unified shader model so that all the shaders included in the graphics pipeline 200 have the same execution platform on the shared SIMD compute units. The shaders, including the vertex shader 203, are therefore implemented using a common set of resources that is referred to herein as the unified shader pool 204. Some embodiments of the unified shader pool 204 are implemented using the compute units 111-114 implemented in the GPU 105 shown in FIG. 1.

A hull shader 205 operates on input high-order patches or control points that are used to define the input patches. The hull shader 205 outputs tessellation factors and other patch data. Primitives generated by the hull shader 205 are optionally provided to a tessellator 206. The tessellator 206 receives objects (such as patches) from the hull shader 205 and generates information identifying primitives corresponding to the input object, e.g., by tessellating the input objects based on tessellation factors provided to the tessellator 106 by the hull shader 205. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 207 inputs a domain location and (optionally) other patch data. The domain shader 207 operates on the provided information and generates a single vertex for output based on the input domain location and other information. A geometry shader 208 receives an input primitive and outputs up to four primitives that are generated by the geometry shader 208 based on the input primitive. One stream of primitives is provided to a rasterizer 209 and up to four streams of primitives are concatenated to buffers in the storage resources 201. The rasterizer 209 performs shading operations and other operations such as clipping, perspective dividing, scissoring, and viewport selection, and the like. A pixel shader 210 inputs a pixel flow and outputs zero or another pixel flow in response to the input pixel flow. An output merger block 211 performs blend, depth, stencil, or other operations on pixels received from the pixel shader 210.

The stages of the graphics pipeline 200 are able to access storage resources 215 that are shared by the waves being executed by the different stages using the processing resources in the unified shader pool 204. Portions of the storage resources 215 are implemented on-chip as part of the GPU 105 shown in FIG. 1 or off-chip using some embodiments of the memory 115 shown in FIG. 1. Although a single graphics pipeline 200 shown in FIG. 2, some embodiments of the storage resources 215 (as well as the unified shader pool 204) are shared by multiple graphics pipelines.

The storage resources 215 include an LDS 220 that is used for read/write communication and synchronization within a workgroup of multiple waves. The storage resources 215 also include VGPR 225 that store state information that define the current state of the waves, such as intermediate results of operations that have been performed by the waves. The storage resources 215 further include a cache hierarchy 230 that is used to cache information such as vertex data, texture data, and other data that is frequently used by one or more of the stages of the graphics pipeline 200. The storage resources 215 further include a suspend memory 235 that stores state information for suspended workloads associated with one or more applications, such as one or more games. In some embodiments, the storage resources 215 also include other registers, buffers, memories, or caches. The shared resources of the graphics pipeline 200 also include bandwidth in the memory fabric that is used to support communication between the stages of the graphics pipeline 200 and the storage resources 215.

Figure 3:
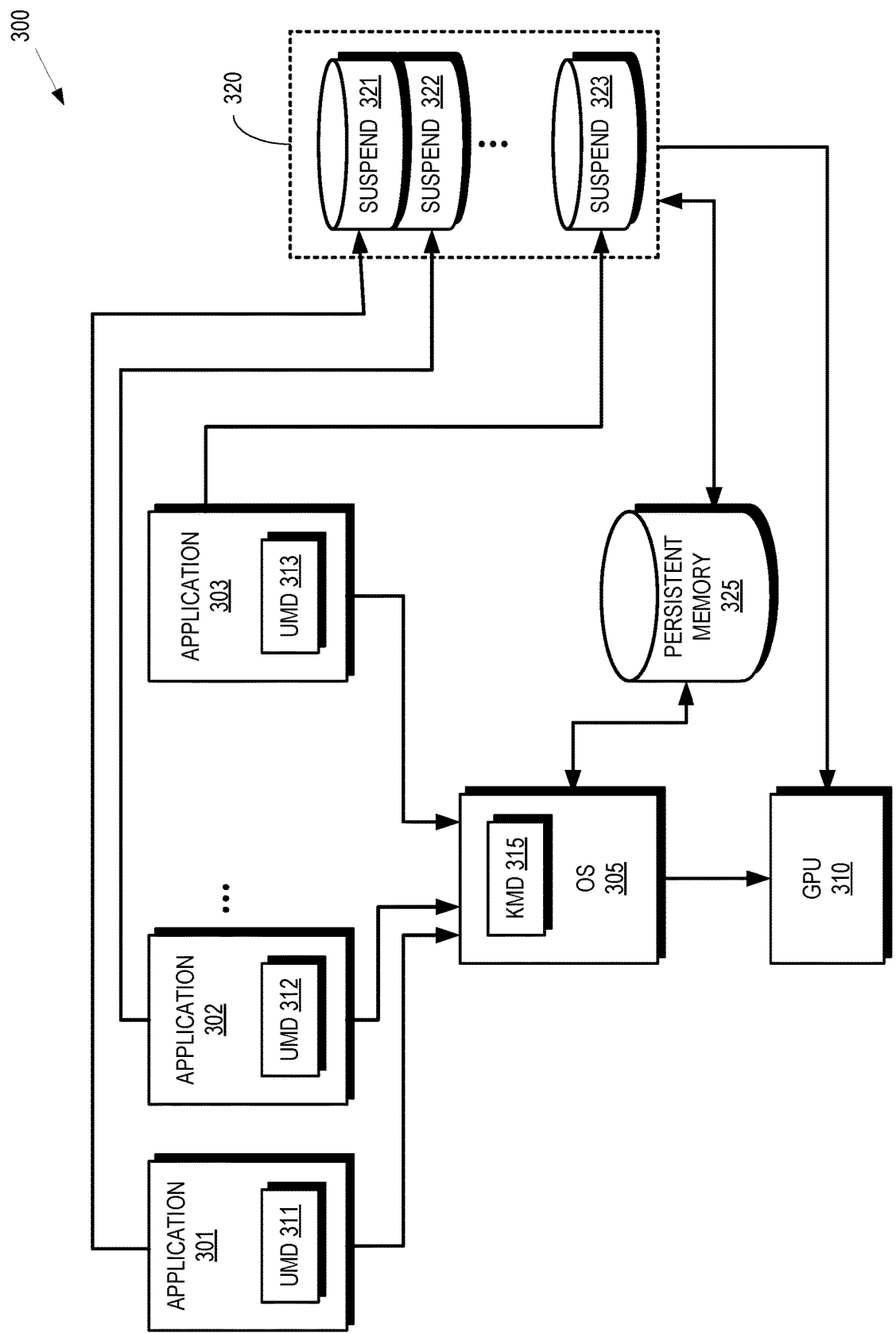
FIG. 3 is a block diagram of a processing system that supports suspend/resume operations for dependent workloads executing on different pipelines according to some embodiments.

FIG. 3 is a block diagram of a processing system 300 that supports suspend/resume operations for dependent workloads executing on different pipelines according to some embodiments. The processing system 300 represents portions of some embodiments of the processing system 100 shown in FIG. 1 and the graphics pipeline 200 shown in FIG. 2.

The processing system 300 is configured to execute applications 301, 302, 303, which are collectively referred to herein as "the applications 301-303." Some embodiments of the applications 301-303 generate compute workloads and graphics workloads that are executed concurrently or in parallel. For example, in some embodiments one or more of the applications 301-303 is a gaming application that utilizes compute workloads such as a physics engine to determine locations of objects in a scene and graphics workloads to render the object for display to a user. The computer and graphics workloads are therefore interdependent. For example, in some embodiments the graphics workloads receive input from the compute workloads that indicates the locations and orientations of objects that are to be rendered by the graphics workloads.

The processing system 300 also implements an operating system (OS) 305 to manage hardware and software resources of the processing system 300 and provide common services to the applications 301-303. Workloads generated by the applications 301-303 are scheduled and provided to a GPU 310 via the OS 305 or scheduling hardware/software. For example, the application 301 generates a first stream of instructions associated with a compute workload and a second stream of instructions associated with a graphics workload. The instructions generated by the application 301 are provided to the GPU 310 for concurrent or parallel execution in multiple pipelines of the GPU 310. In the interest of clarity, the multiple pipelines are not illustrated in FIG. 3. One subset of the pipelines of the GPU 310 is used to execute the compute and graphics workloads and another subset of the pipelines of the GPU 310 is used to execute the OS 305.

Device drivers are used to provide the applications 301-303 and the OS 305 with access to hardware resources of the processing system 300. In the illustrated embodiment, the applications 301-303 are associated with corresponding user mode drivers (UMD) 311, 312, 313, which are collectively referred to herein as "the UMD 311-313." The UMD 311-313 attaches to the corresponding application 301-303 in response to compilation or execution of the corresponding application 301-303 and typically implements graphics or compute application programming interfaces (APIs). The OS 305 interfaces with a kernel mode driver (KMD) 315 that closely works with the kernel of the OS 305 to provide access to low-level hardware features including, in some cases, but not limited to scheduling, power management, and the like.

A portion 320 of a memory in the processing system 300 is used to store state information for suspended applications. The portion 320 is implemented in some embodiments of the memory 115 shown in FIG. 1 and the storage resources 215 shown in FIG. 2. In the illustrated embodiment, the portion 320 includes suspend memories 321, 322, 323, which are collectively referred to herein as "the suspend memories 321-323." Each of the suspend memories 321-323 is associated with a corresponding one of the applications 301-303 and is used to store state information for the corresponding application 301-303. The suspend memories 321-323 are allocated to the corresponding application 301-303 in response to the application 301-303 initiating execution in the processing system 300, in response to suspending the application 301-303, or in response to other conditions or events in the processing system 300.

State information is read from the suspend memories 321-323 in response to resuming execution of a corresponding application 301-303. For example, state information used to configure multiple pipelines that execute compute and graphics workloads for the application 301 are stored in the suspend memory 321 in response to suspension of execution of the application 301 on the GPU 310. The application 302 begins execution on the pipelines of the GPU 310 that were made available by suspension of the application 301. In response to completion or suspension of the application 302, state information stored in the suspend memory 321 is provided to the GPU 310, which uses the state information to configure the graphics pipelines on the same compute units or fixed function hardware that were previously executing the compute or graphics workloads for the application 301. The GPU 310 then resumes execution of the application 301 from the same state as the state at which the application 301 was suspended.

Allocating separate suspend memories 321-323 to the applications 301-303 enables the suspension or resumption of the application 301-303 in arbitrary order. For example, if the application 301 is suspended, either of the applications 302, 303 (or any other application that has state information stored in a corresponding suspend memory in the portion 320) can be resumed on the basis of state information stored in the corresponding suspend memories 322, 323. Thus, the suspend memories 321-323 do not operate like a memory stack. Furthermore, user mode task switching between the applications 301-303 is performed at runtime without intervention by the corresponding application 301-303. Instead, the OS 305 performs suspension or resumption of the application 301-303. Furthermore, the number of applications 301-303 that can be suspended by the OS 305 is only limited by the size of the portion 320 of the memory that is available for allocating suspend memories 321-323.

Some embodiments of the processing system 300 include a persistent memory 325 that is able to retain information one other portions of the processing system 300 are powered down if the allocated suspend memories 321-323 do not retain information when powered down, e.g., if the suspend memories 321-323 are implemented using volatile memory elements such as DRAM. For example, the persistent memory 325 retains information when power is removed from the portion 320 of the memory and a voltage provided to the suspend memories 321-323 is insufficient to retain data in the memory elements used to implement the portion 320. Examples of implementations of the persistent memory 325 include memories that are implemented using magnetic storage such as hard disks, solid state storage such as solid state drives (SSDs), nonvolatile random access memory (NVRAM), using memory elements that are attached to a different power supply mesh than other elements within the processing system 300, or using other techniques or structures that allow the persistent memory 325 to retain information when the suspend memories 321-323 are not able to retain information due to a loss or reduction of power or voltage.

The processing system 300 is able to resume execution of any of the applications 301-303 following a power-down/power-up cycle by moving information in one or more of the suspend memories 321-323 to the persistent memory 325 in response to a loss or reduction of power or voltage supplied to the suspend memories 321-323. For example, state information for one or more of the application 301-303 is moved from one or more of the suspend memories 321-323 to the persistent memory 325 in response to the processing system 300 initiating a power down operation. The persistent memory 325 retains the state information while the processing system 300 is in the powered down state. State information is then written from the persistent memory 325 back to one or more of the suspend memories 321-323 in response to power or voltage being restored to the suspend memories 321-323, e.g., in response to the processing system 300 returning to a powered up state. The applications 301-303 are then able to begin operation from a previously stored state using the information stored in the suspend memories 321-323, e.g., the applications 301-303 are able to resume operation from the same state that existed prior to powering down the processing system 300.

Figure 4:
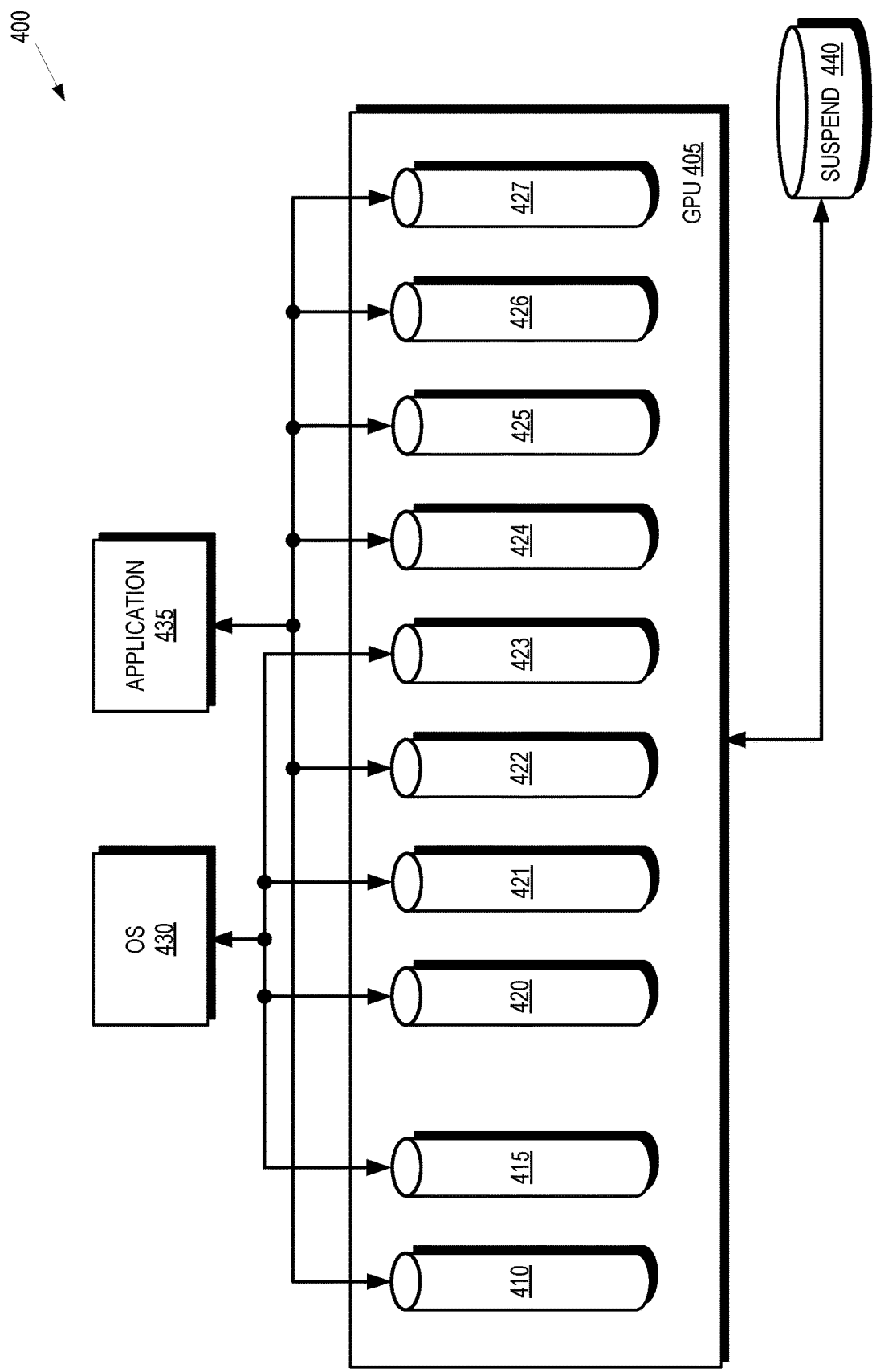
FIG. 4 is a block diagram of a processing system that supports suspend/resume operations for dependent workloads executing on subsets of pipelines according to some embodiments.

FIG. 4 is a block diagram of a processing system 400 that supports suspend/resume operations for dependent workloads executing on subsets of pipelines according to some embodiments. The processing system 400 represents portions of some embodiments of the processing system 100 shown in FIG. 1, the graphics pipeline 200 shown in FIG. 2, and the processing system 300 shown in FIG. 3.

The processing system 400 includes a GPU 405 that implements graphics pipelines 410, 415 and compute pipelines 420, 421, 422, 423, 424, 425, 426, 427, which are collectively referred to herein as "the compute pipelines 420-427." Some embodiments of the graphics pipelines 410, 415 or the compute pipelines 420-427 are implemented using the graphics pipeline 200 shown in FIG. 2. The graphics pipelines 410, 415 and the compute pipelines 420-427 are configured to execute graphics workloads and compute workloads, respectively, concurrently or in parallel. Depending on the implementation, the graphics pipelines 410, 415 and the compute pipelines 420-427 may or may not share programmable and fixed function execution hardware implemented in the GPU 405. As discussed herein, in some embodiments the workloads executing on the graphics pipelines 410, 415 and the compute pipelines 420-427 are dependent upon each other.

An OS 430 such as the OS 305 shown in FIG. 3 and one or more applications 435 such as the applications 301-303 shown in FIG. 3 execute on the processing system 400. The OS 430 and the application 435 are able to execute concurrently or serially using different subsets of the pipelines in the GPU 405. In the illustrated embodiment, the OS 430 is executing on a subset of pipelines that includes the graphics pipeline 415 and the compute pipelines 420, 421, 423. The application 435 is executing on a different, mutually exclusive, subset of pipelines that includes the graphics pipeline 410 and the compute pipelines 422, 424-427. The states of the subsets that are executing the OS 430 and the application 435 are defined by corresponding sets of state information.

The processing system 400 includes one or more suspend memories 440 such as the suspend memory 235 shown in FIG. 2 and the suspend memories 321-323 shown in FIG. 3. The suspend memory 440 is allocated to the application 435 and is used to store state information when the application 435 is suspended. For example, state information for the pipelines 410, 422, 424-427 is stored in the suspend memory 440 in response to execution of graphics and compute workloads generated by the application 435 being suspended. The pipelines 410, 422, 424-427 are selectively suspended while execution of the OS 430 on the pipelines 415, 420, 421 continues without interruption. Once execution of the application 435 on the pipelines 410, 422, 424-427 is suspended, other graphics workloads or compute workloads generated by other applications are dispatched to the pipelines 410, 422, 424-427 for execution. In some embodiments, execution of the OS 430 is suspended by writing state information for the pipelines 420, 421, 423 to an OS suspend memory (not shown, in the interest of clarity) and then selectively suspending execution of the OS workload on the pipelines 420, 421, 423. Execution of workloads generated by both the OS 430 and the application 435 could also be suspended and the corresponding state information stored in the OS suspend memory and the suspend memory 440, respectively.

The operational state of some or all of the pipelines 410, 422, 424-427 are selectively returned to their previous states in response to completion or suspension of the other graphics or compute workloads. For example, state information for the application 435 is used to configure the processor cores that implement the pipelines 410, 422, 424-427 to the state prior to suspending the application 435. The application 435 is therefore able to resume execution from precisely the state at which execution left off when the application 435 was suspended. In cases where the OS 430 has been suspended, the OS 430 is resumed by reading state information from the OS suspend memory and using this information to configure the pipelines 420, 421, 423 before resuming any previously suspended applications associated with the OS 430.

Figure 5:
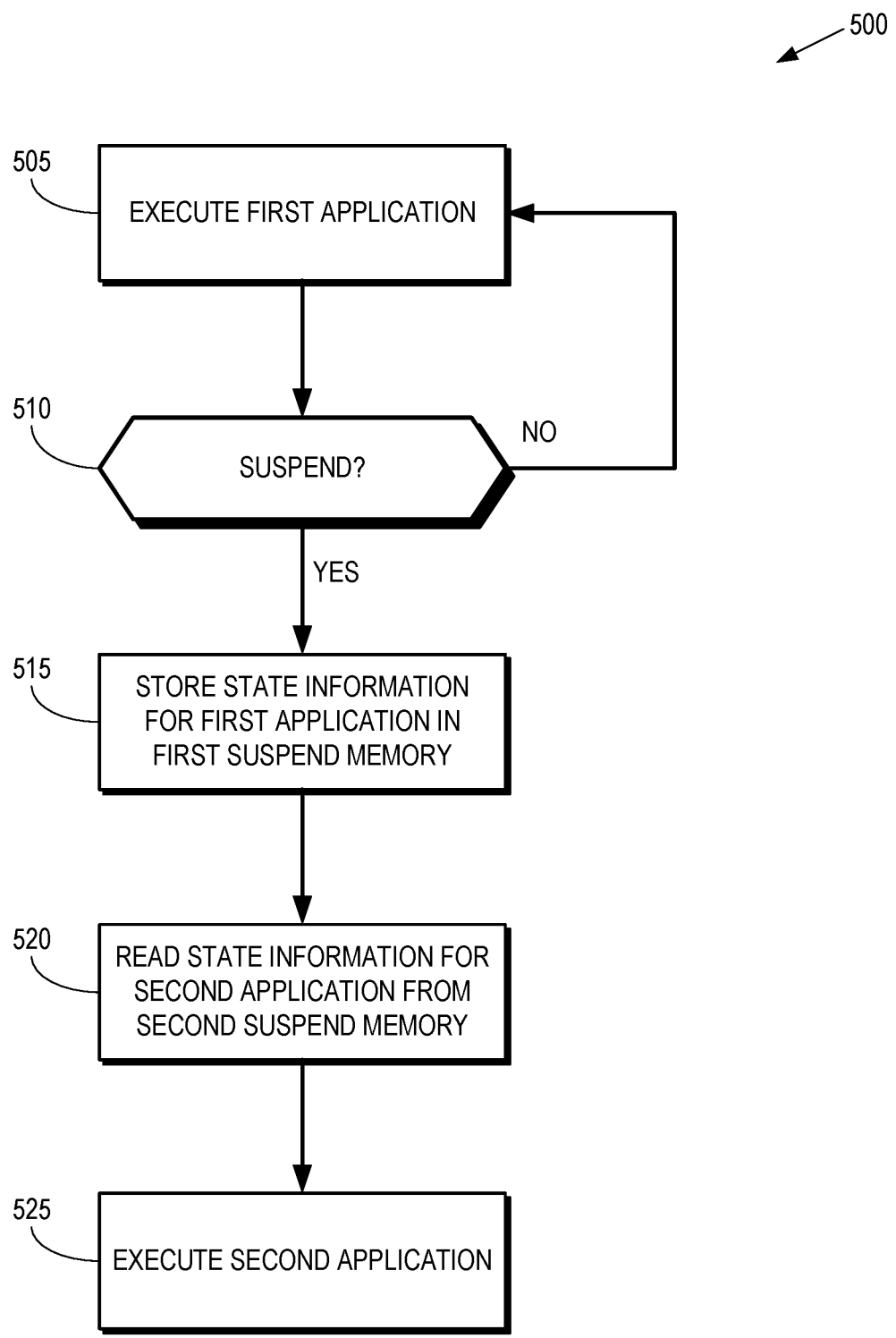
FIG. 5 is a flow diagram of a method of suspending a first application executing on a subset of pipelines in a GPU to allow a second application to utilize the subset of pipelines according to some embodiments.

FIG. 5 is a flow diagram of a method 500 of suspending a first application executing on a subset of pipelines in a GPU to allow a second application to utilize the subset of pipelines according to some embodiments. The method 500 is implemented in some embodiments of the processing system 100 shown in FIG. 1, the graphics pipeline 200 shown in FIG. 2, the processing system 300 shown in FIG. 3, and the processing system 400 shown in FIG. 4. In the illustrated embodiment, the second application was previously suspended and state information defining states of the subset of pipelines was stored in a corresponding suspend memory. However, some embodiments of the method 500 are also used to initiate execution of an application that was not previously executing in the processing system.

At block 505, a first application is executing on a subset of pipelines of a GPU. For example, the first application is executing compute and graphics workloads on a subset of compute pipelines and a subset of graphics pipelines of a GPU. The first application generates first and second workloads such as a compute workload and a graphics workload. The second workload is dependent upon the first workload, e.g., the first workload provides inputs to the second workload during execution.

At decision block 510, the processing system determines whether a suspend condition is detected. If not, the GPU continues executing the first application on the subset of the pipelines. If a suspend condition is detected, the method flows to block 515.

At block 515, state information for the first application is stored in a first suspend memory. The first suspend memory is allocated to the first application when execution of the first application begins, in response to the suspend condition, or in response to other conditions or events in the processing system. The state information represents states of the subset of pipelines that are executing workloads generated by the first application. Other, mutually exclusive, subsets of the pipelines continue to execute other workloads and the state information for the other subsets is not stored in the first suspend memory. At this point in the method 500, the subsets of the pipelines that were executing the first application are available for allocation to other applications.

At block 520, state information for the second application is read from a second suspend memory if the second application was previously suspended. Otherwise, the second application is executed as a new application. The state information is used to reconfigure the subset of pipelines to states that existed prior to suspension of the second application. The second application is therefore able to resume execution from precisely the pipeline state that existed prior to suspension of the second application.

At block 525, the processing system executes the second application using the subset of the pipelines beginning at the state represented by the state information that was read from the second suspend memory.

Figure 6:
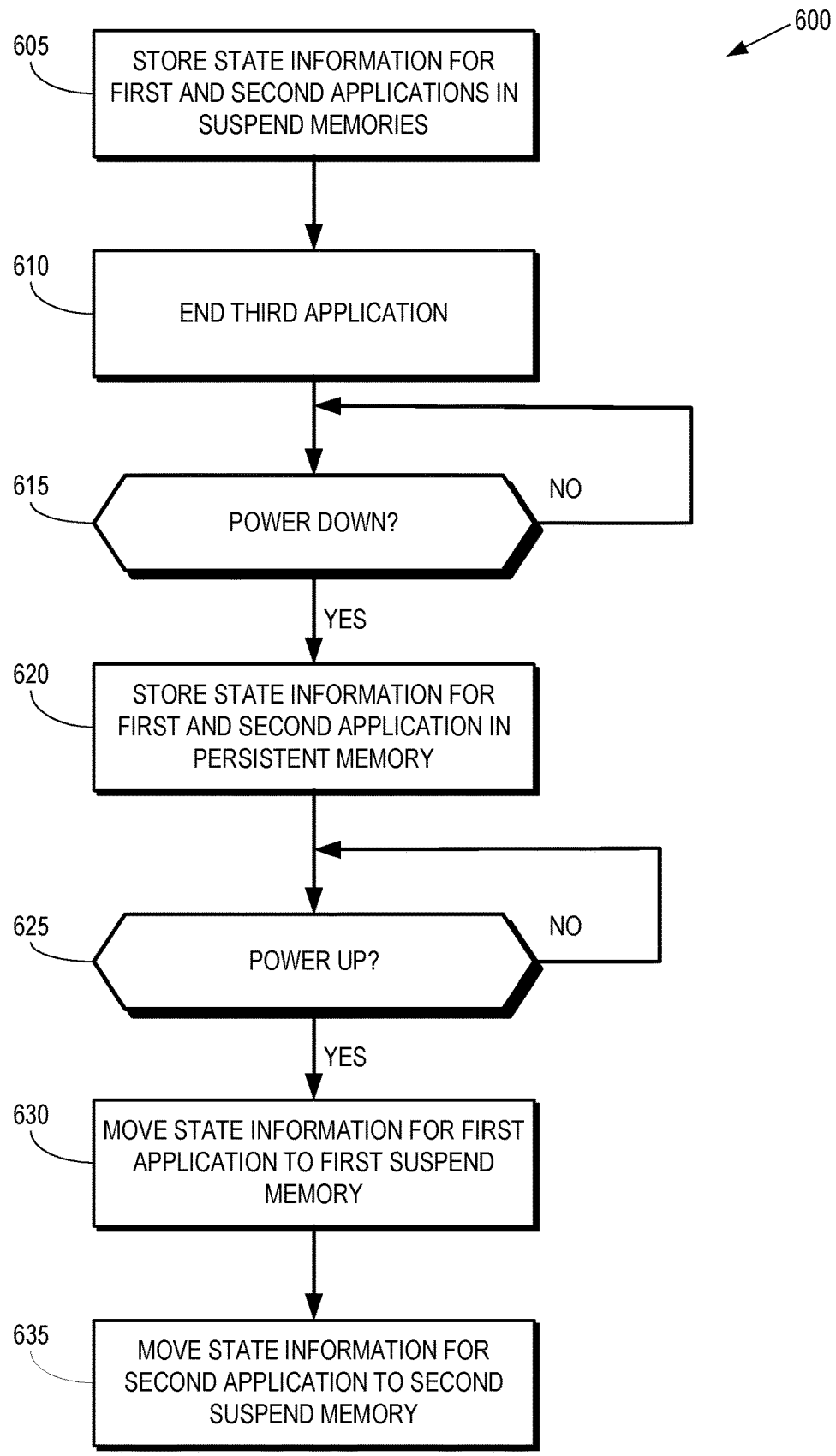
FIG. 6 is a flow diagram of a method of moving state information from one or more suspend memories to a persistent memory according to some embodiments.

FIG. 6 is a flow diagram of a method 600 of moving state information from one or more suspend memories to a persistent memory according to some embodiments. The method is implemented in some embodiments of the processing system 300 shown in FIG. 3.

At block 605, state information for first and second applications is stored in the corresponding suspend memories. For example, in some embodiments state information for the first application is stored in the first suspend memory when execution of the first application on a subset of pipelines in a GPU is suspended. The second application subsequently executes on the subset of pipelines and is later suspended. At that point, state information for the second application is stored in a second suspend memory. A third application then begins executing on the subset of the pipelines.

At block 610, execution of the third application on the subset of pipelines completes.

At decision block 615, the processing system determines whether a power down condition exists. If not, the processing system continues monitoring the power state. If a power down condition is detected, the method 600 flows to block 620.

At block 620, state information for the first and second applications is moved from the suspend memories and stored in a persistent memory that is able to retain information while the processing system is in the power down state. The processing system then powers down and enters the power down state, which interrupts supply of power or voltage to the suspend memories. Information stored in the suspend memories is lost or corrupted in response to interruption of the power supply or voltage supply.

At decision block 625, the processing system determines whether a power up condition exists. If not, the processing system continues to monitor the power state. If the processor determines that a power up condition exists, the method 600 flows to block 630.

At block 630, state information for the first application is moved from the persistent memory and stored in a corresponding faster but volatile first suspend memory that is allocated to the first application.

At block 635, state information for the second application is moved from the persistent memory and stored in a corresponding faster but volatile second suspend memory that is allocated to the second application. At this point, either the first or the second application is resumed for execution on the subset of the pipelines by reconfiguring the pipelines using the stored state information.

In some embodiments, the apparatus and techniques described above are implemented in a system comprising one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
executing a first workload generated from a first application in a processor;
in response to initiating execution of a workload generated from the first application, allocating a first suspend memory of a plurality of suspend memories to the first application, wherein each respective memory of the plurality of suspend memories is to be allocated to a different application executing at the processor;
executing a second workload generated from the first application in the processor, wherein the second workload is dependent upon the first workload;
executing a third workload in the processor concurrently with executing the first and second workloads;
concurrently suspending the first and second workloads based on the dependency while continuing to execute the third workload in the processor; and
storing state information for the first and second workloads in the first suspend memory in response to suspending the first and second workloads.

2. The method of claim 1, wherein executing the first workload comprises executing a compute workload in a compute pipeline of the processor, and wherein executing the second workload comprises executing a graphics workload in a graphics pipeline of the processor.

3. The method of claim 1, further comprising:
executing at least one fourth workload in the first and second subsets of pipelines of the processor in response to suspending the first and second workloads, wherein the first workload is executed in the first subset of the pipelines and the second workload is executed in the second subset of the pipelines.

4. The method of claim 3, further comprising:
in response to completion or suspension of the at least one fourth workload, configuring the first and second subsets of the pipelines on the basis of the state information stored in the first memory; and
resuming execution of the first and second workloads in the first and second subsets of the pipelines, respectively, after configuring the first and second subsets of the pipelines.

5. The method of claim 4, wherein resuming execution of the first and second workloads comprises resuming execution of the first and second workloads on a set of compute units that is the same as the set of compute units that executed the first and second workloads prior to suspension.

6. The method of claim 1, further comprising:
in response to powering down the processor, moving the state information from the first suspend memory to a persistent memory that retains the state information while the processor is powered down.

7. The method of claim 6, further comprising:
in response to powering up the processor, moving the state information from the persistent memory to the first suspend memory.

8. The method of claim 1, wherein the first workload is executed in a first subset of pipelines of the processor, wherein the second workload is executed in a second subset of the pipelines of the processor, and wherein the third workload is executed in a third subset of the pipelines of the processor.

9. The method of claim 8, wherein the first, second, and third subsets of the pipelines of the processor are mutually exclusive.

10. An apparatus comprising:
a parallel coprocessor including a plurality of compute units configured to implement a plurality of pipelines, wherein the coprocessor is configured to:
execute a first workload generated from a first application;
in response to initiating execution of a workload generated from the first application, allocate a first suspend memory of a plurality of suspend memories to the first application, wherein each respective suspend memory of the plurality of suspend memories is to be allocated to a different application executing at the parallel coprocessor;
execute a second workload generated from the first application, wherein the second workload is dependent upon the first workload;
execute a third workload concurrently with executing the first and second workloads;
concurrently suspend the first and second workloads based on the dependency while continuing to execute the third workload; and
store state information for the first and second workloads in the first suspend memory in response to suspending the first and second workloads.

11. The apparatus of claim 10, wherein a first subset of the plurality of pipelines comprises a compute pipeline configured to execute a compute workload, and wherein a second subset of the plurality of pipelines comprises a graphics pipeline configured to execute a graphics workload.

12. The apparatus of claim 10, wherein the parallel coprocessor is configured to execute at least the first workload in a first subset of the plurality of pipelines, wherein the parallel coprocessor is configured to execute the second workload in a second subset of the plurality of pipelines, and wherein the parallel coprocessor is configured to execute at least one fourth workload in the first and second subsets of the pipelines in response to suspending the first and second workloads.

13. The apparatus of claim 12, wherein the first and second subsets of the pipelines are configured on the basis of the state information stored in the first suspend memory in response to completion or suspension of the at least one fourth workload, and wherein the parallel coprocessor resumes execution of the first and second workloads in the first and second subsets of the pipelines, respectively, after configuring the first and second subsets of the pipelines.

14. The apparatus of claim 13, wherein the parallel coprocessor is configured to resume execution of the first and second workloads on a subset of the plurality of compute units that is the same as the subset of the plurality of compute units that executed the first and second workloads prior to suspension.

15. The apparatus of claim 10, wherein the parallel coprocessor is configured to move state information from the first suspend memory to a second suspend memory in response to powering down the parallel coprocessor, wherein the second suspend memory retains the state information while the parallel coprocessor is powered down.

16. The apparatus of claim 15, wherein the parallel coprocessor is configured to move state information from the second suspend memory to the first suspend memory in response to powering up the parallel coprocessor.

17. The apparatus of claim 10, wherein the parallel coprocessor is configured to execute the first workload in a first subset of the plurality of pipelines, wherein the parallel coprocessor is configured to execute the second workload in a second subset of the plurality of pipelines, and wherein the parallel coprocessor is configured to execute the third workload in a third subset of the plurality of pipelines.

18. The apparatus of claim 17, wherein the first, second, and third subsets of the plurality of pipelines are mutually exclusive.

19. A method comprising:
   allocating a first suspend memory of a plurality of suspend memories to a first application executing at a processor;
   concurrently executing first workloads and a second workload at the processor;
   concurrently suspending the first workloads while continuing to execute the second workload, wherein the first workloads are generated from the first application, wherein a dependency exists between the first workloads, and wherein concurrently suspending the first workloads is based on the dependency;
   storing state information for the first workloads in the first suspend memory in response to suspending the first workloads;
   retrieving the state information for the first workloads from the first suspend memory in response to an indication that the first workloads are to resume; and
   resuming execution of the first workloads on the basis of the retrieved state information.

20. The method of claim 19, wherein the first workloads are executed in a first subset of pipelines of the processor, and wherein the second workload is executed in a second subset of the pipelines of the processor.

21. The method of claim 20, wherein the first and second subsets of the pipelines of the processor are mutually exclusive.

* * * * *